US006292902B1

(12) United States Patent
Drobnik

(10) Patent No.: US 6,292,902 B1
(45) Date of Patent: Sep. 18, 2001

(54) METHOD AND APPARATUS FOR REGULATING POWER CONSUMED BY A PROCESSOR

(75) Inventor: Josef C. Drobnik, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/234,043

(22) Filed: Jan. 19, 1999

(51) Int. Cl.⁷ .................................................. G06F 13/00
(52) U.S. Cl. ........................... 713/320; 713/310; 713/340
(58) Field of Search ..................................... 713/300, 310, 713/323, 324, 330, 340

(56) References Cited

U.S. PATENT DOCUMENTS

| | | | |
|---|---|---|---|
| 5,744,944 | * | 4/1998 | Danstrom .............................. 323/284 |
| 5,848,270 | * | 12/1998 | Deluca et al. ........................ 395/675 |
| 5,987,615 | * | 11/1999 | Danstrom .............................. 713/300 |

* cited by examiner

*Primary Examiner*—Robert Beausoleil
*Assistant Examiner*—Raymond N Phan
(74) *Attorney, Agent, or Firm*—Blakely, Sokoloff, Taylor & Zafman LLP

(57) ABSTRACT

A computer system includes a processor. The processor generates current demand information corresponding to applications run by the processor. A power regulator unit is coupled to the processor. The power regulator unit regulates power to the processor in response to the current demand information.

13 Claims, 6 Drawing Sheets

METHOD AND APPARATUS FOR REGULATING POWER CONSUMED BY A PROCESSOR

FIELD OF THE INVENTION

The present invention relates to the field of power regulation of processors in computer systems. More specifically, the present invention relates to detecting and responding to dramatic increases and decreases of current demand of processors in computer systems.

BACKGROUND OF THE INVENTION

Modem processors in computer systems experience dramatic swings in current demand. The change in current demand per unit time is characterized as di/dt. Dramatic increases and decreases in current demand may occur, for example, when a processor transitions between a state of inactivity such as a sleep state or a state where the processor is waiting for data and a state of activity such as a normal operation state or a state where intense computation must be performed. When a power regulation system in a computer system is unable to respond to an increase in current demand in a timely manner, the computer system may experience undesirable delays, halt, or reset. When the power regulation system in the computer system is unable to respond to a decrease in current demand in a timely manner, the components in the computer system may be damaged due to the resulting increase of the voltage.

In the past, designers placed decoupling capacitors between processors and power regulators. The output capacitors operated as energy sources and energy sinks to meet increases and decreases in current demand of the processors until the power regulation systems were able to detect the change in current demand and respond. This solution, however, is not effective in modem computer systems which have processors with increased power requirements. Present processors may experience an increase or decrease in current requirement by a factor of 40 where di/dt may be as high as 1 amp per nanosecond. The area on most processors and motherboards are unable to accommodate the number and size of the output capacitors that would be required to sufficiently respond to increases and decreases in current demand of this magnitude.

SUMMARY

A computer system is described. The computer system includes a processor. The processor generates current demand information corresponding to applications run by the processor. A power regulator unit is coupled to the processor. The power regulator unit regulates power to the processor in response to the current demand information.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
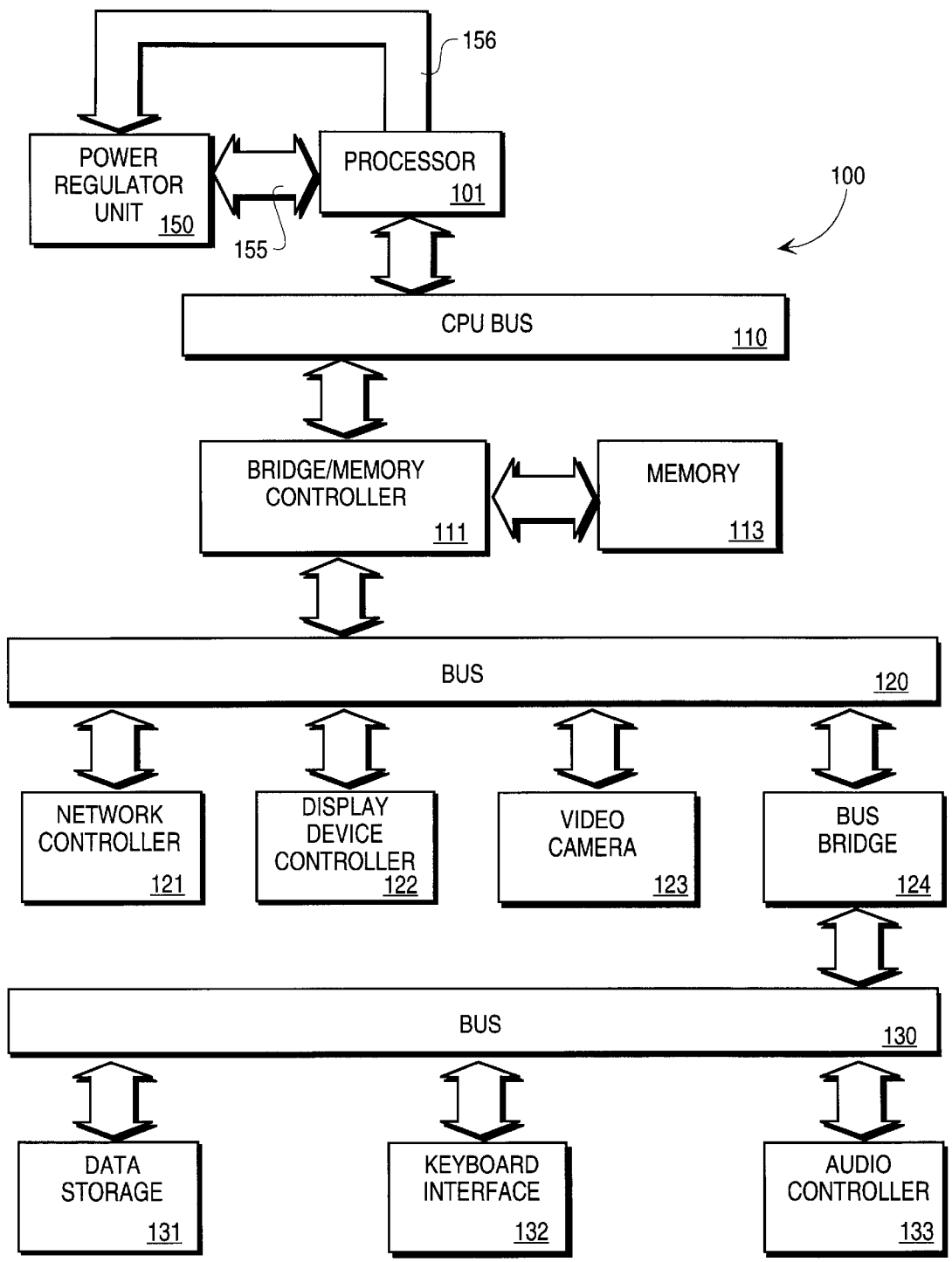
FIG. 1 is a block diagram of a computer system implementing an embodiment of the present invention.

FIG. 1 illustrates a computer system 100 upon which an embodiment of the present invention can be implemented. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a synchronous direct random access memory (SDRAM) device, or other memory device. The memory 113 may store instructions and code represented by data signals that may be executed by the processor 101.

A bridge/memory controller 111 is coupled to the CPU bus 110 and the memory 113. The bridge/memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device controller 122 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100. A video camera 123 is coupled to the first I/O bus 120.

A second I/O bus 130 may be a single bus or a combination of multiple buses. As an example, the second 1,0 bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard (not shown) to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

A power regulator unit 150 is coupled to the processor 101. The power regulator unit 150 receives voltage from a system power supply (not shown) and regulates the voltage from the system power supply according to the demands of the processor 101. The power regulator unit 150 transmits the regulated voltage to the processor 101 on power transmission line 155. According to an embodiment of the present invention, the power regulator unit 150 receives current demand information from the processor 101 on data transmission line 156. The current demand information includes information that indicates an amount of current required by the processor 101 to support applications that are running or applications that will be run by the processor 101. The power regulator unit 150 uses the current demand information to respond to the power requirements of the processor 101 before a change in power requirement may be detected at the output terminals of a low-pass filter (not shown) in the power regulator unit 150. This allows the power regulator unit 150 to respond quickly to changing power requirements of the processor 101 while reducing the effects of delays associated with an increase in power demand and excess voltage with a decrease in power demand.

It should be appreciated that other components in the computer system 100, such as the bridge/memory controller 111, memory 113, network controller 121, and data storage device 131, may be powered directly from the system power supply or from other power regulator units (not illustrated). For the purpose of clarity, only the power regulator unit regulating power to the processor 101 is shown in FIG. 1.

According to an embodiment of the present invention, generating current demand information is performed by the processor 101 in response to executing a sequence of instructions in main memory 113. Such instructions may be read into memory 113 from another computer-readable medium, such as data storage device 131, or from another source via the network controller 121. Execution of the sequence of instructions causes the processor 101 generate current demand information, as will be described hereafter. In an alternate embodiment, hardwired circuitry may be used in place of or in combination with software instructions to implement this embodiment of the present invention. Thus, this embodiment of the present invention is not limited to any specific combination of hardware circuitry and software.

Figure 2:
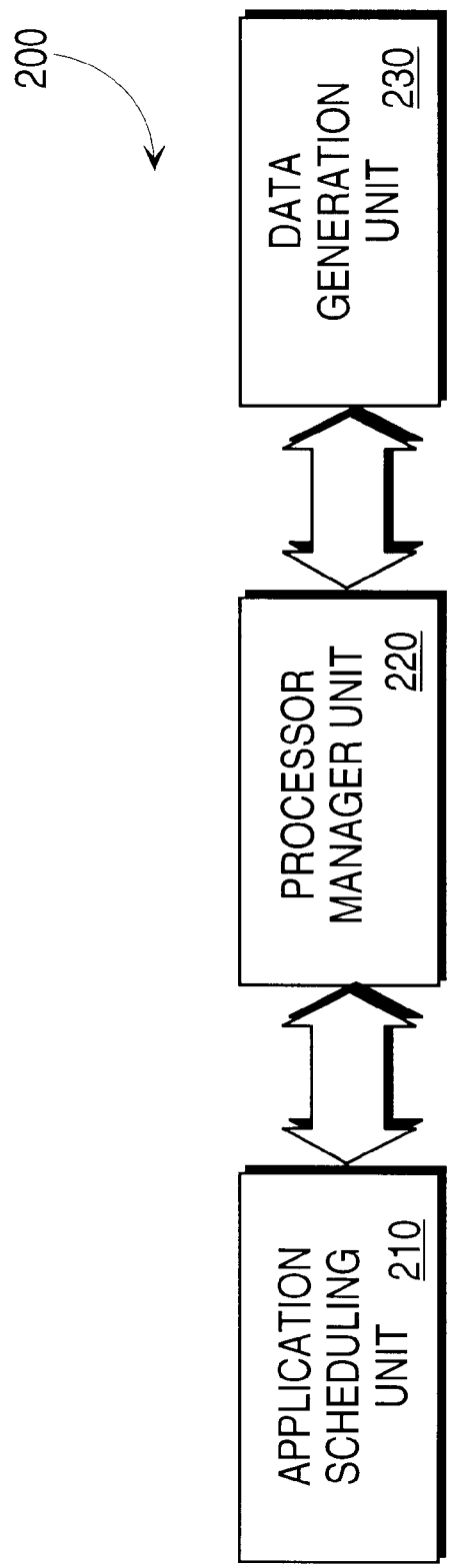
FIG. 2 is a block diagram of a current demand information generation unit according to an embodiment of the present invention.

FIG. 2 is a block diagram of a current demand information generator unit 200 according to an embodiment of the present invention. According to an embodiment of the present invention, the current demand information generator 200 is implemented by software and resides in main memory 113 (shown in FIG. 1) as a sequence of instructions. It should be appreciated that the current demand information generator 200 may also be implemented by hardware as components coupled to the bus 120 (shown in FIG. 1) or a combination of both hardware and software. The current demand information generator 200 includes an application scheduling unit 210. The application scheduling unit 210 interfaces with an operating system (not shown) of the computer system 100 (shown in FIG. 1) and obtains information regarding applications currently running by the processor 101 and applications to be run by the processor 101 (shown in FIG. 1).

A processor manager unit 220 is coupled to the application scheduling unit 210. The processor managing unit 220 receives the information regarding applications currently running and applications to be run by the processor 101. The processor manager unit 220 determines an amount of power required by the processor 101 to support execution of the applications. The processor manager unit 220 may reference records including information regarding the number of processor cycles required to execute specified applications or other records to determine the amount of power required by the processor 101 to support execution of specified applications.

A data generation unit 230 is coupled to the processor manager unit 220. The data generation unit 230 receives data corresponding to the amount of power required by the processor 101 to support execution of applications running or to be run by the processor 101 from the processor manager unit 220. The data generation unit 230 generates and transmits current demand information corresponding to the amount of power required by the processor 101 to the power regulator unit 150.

It should be appreciated that the application scheduling unit 210, processor manager unit 220, and data generation unit 230 may be coupled together in a manner other than that shown in FIG. 2. The application scheduling unit 210, processor manager unit 220, and data generation unit 230 may be implemented using any known circuitry or technique. In an embodiment of the present invention where the current demand information generator 200 is implemented in hardware, the application scheduling unit 210, processor manager unit 220, and data generation unit 230 all reside on a single semiconductor substrate.

Figure 3:
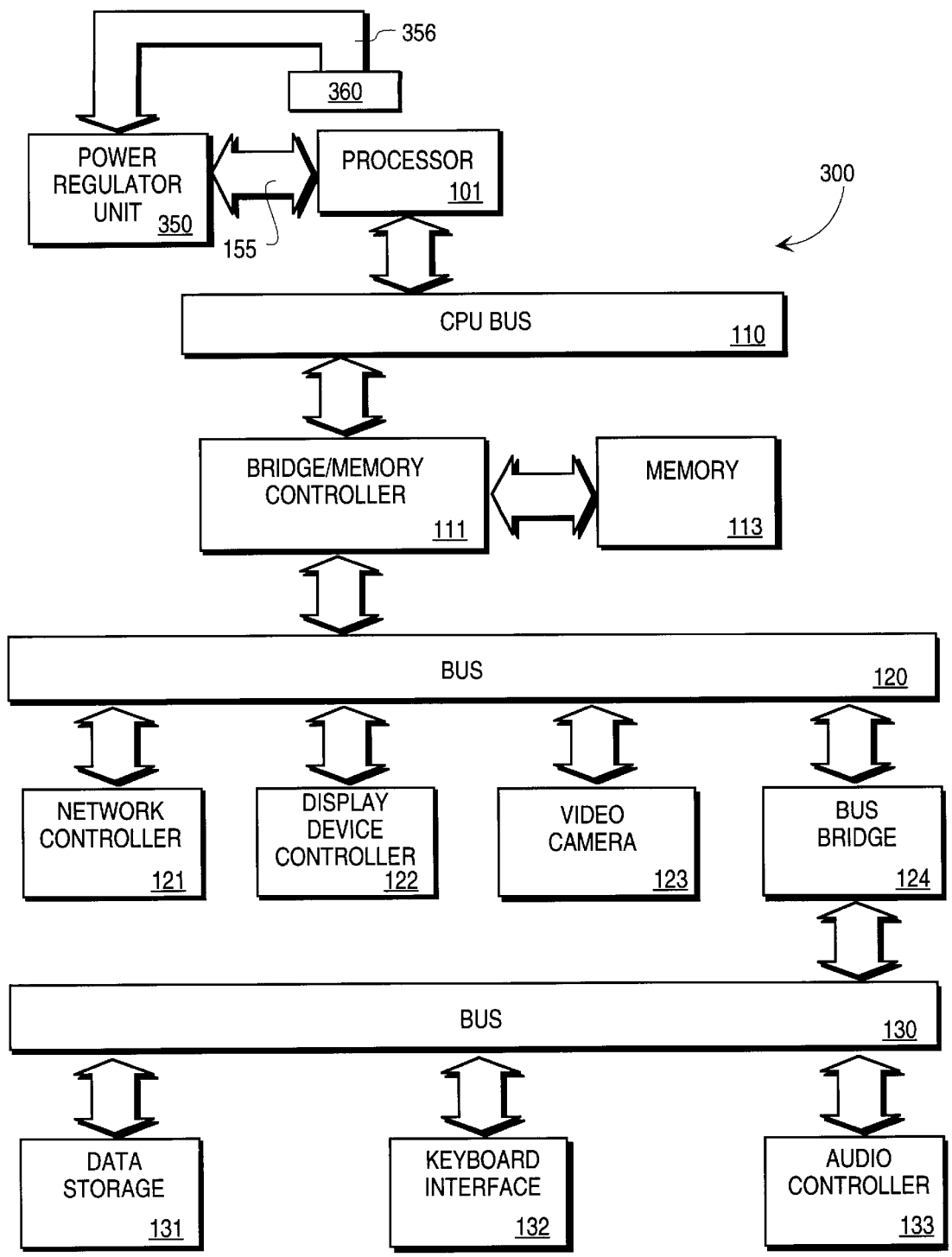
FIG. 3 is a block diagram of a computer system implementing a second embodiment of the present invention.

FIG. 3 illustrates a power regulator unit 350 according to a second embodiment of the present invention. The power regulator unit 350 is coupled to a computer system 300 similar to the computer system illustrated in FIG. 1. The power regulator unit 350 receives voltage from a system power supply (not shown) and regulates the voltage from the system power supply according to the demands of the processor 101. The power regulator unit 350 transmits the regulated voltage to the processor 101 on power transmission line 155.

A current sensor 360 is coupled to the power regulator unit 350. The current sensor 360 is placed in a location proximate to the processor 101 and senses the current demand of the processor 101. The current sensor 360 may be placed, for example, in a location proximate to a Vcc pin of the processor 101. According to an embodiment of the present invention, the current sensor may be a lossless current sensor such as a giant magnetic resistor or other lossless current sensor. The current sensor 360 generates current demand information and transmits the current demand information to the power regulator unit 350 on data transmission line 356. The current demand information includes information that indicates an amount of current required by the processor 101 to support applications that it is running. The power regulator unit 350 uses the current demand information to respond to the power requirements of the processor 101 before the change in power requirement may be detected at the output terminals of a low-pass filter or remote voltage sensor (not shown) in the power regulator unit 350. This allows the power regulator unit 350 to respond quickly to changing power requirements of the processor 101 while reducing the effects of delays associated with an increase in power demand and excess voltage with a decrease in power demand.

It should be appreciated that other components in the computer system 300, such as the bridge/memory controller 111, memory 113, network controller 121, and data storage device 131, may be powered directly from the system power supply or from other power regulator units (not illustrated). For the purpose of clarity, only the power regulator unit regulating power to the processor 101 is shown in FIG. 3.

Figure 4:
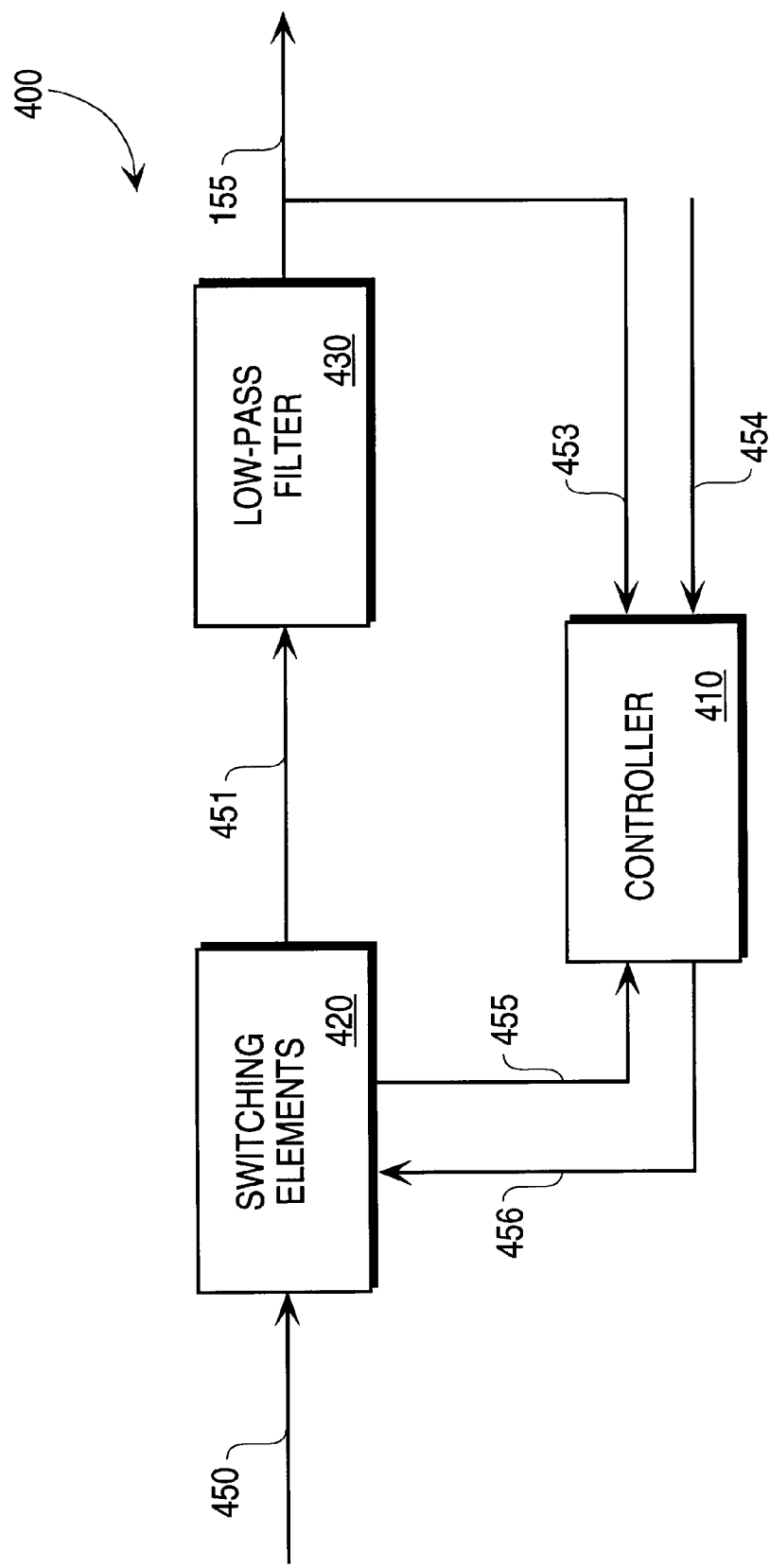
FIG. 4 is a block diagram of a power regulator unit according to an embodiment of the present invention.

FIG. 4 is a block diagram illustrating a power regulator unit 400 according to an embodiment of the present invention. The power regulator unit 400 may be implemented as the power regulating units 150 and 350 shown in FIGS. 1 and 3. The power regulator unit 400 includes a controller 410. The controller 410 manages the power regulator unit 400 such that it delivers an appropriate amount of power on the power transmission line 155 to the processor 101 (shown in FIG. 1). The controller 410 receives current demand information that indicates an amount of current required by the processor 101. The current demand information is delivered to the controller 410 via line 454. Line 454 may represent the line 156 shown in FIG. 1 or the line 356 shown in FIG. 3. The controller also receives information relating to the amount of power on the output terminal of a low-pass filter 430 at the power transmission line 155. The information relating to the amount of power on the output terminal of the low-pass filter 430 at the power transmission line 155 is delivered to the controller via line 453. The information relating to the amount of power at the output terminal of the low-pass filter 430 at the power transmission line 155 may be a voltage and current measurement taken off of the power transmission line 155. Optionally, the controller 410 may also receive information regarding a magnitude of a current through switching elements 420 via line 455. The controller 410 generates control signals that are used to control switching elements 420 such that an appropriate amount of power is generated to the processor 101 in response to the power demand of the processor 101.

The switching elements 420 and the low-pass filter 430 operate as the power regulation circuitry of the power regulator unit 400. The switching elements 420 are coupled to the controller 410 via line 456 and receive power from the system power supply (not shown) via line 450. The switching elements 420 control an amount of power from the system power supply that is transmitted to the low-pass filter 430 via line 451 in response to the control signals from the controller 410. The switching elements may be implemented by field-effect transistors (FETs), bipolar junction transistors (BJTs) or other types of switches. The low-pass filter 430 filters the output voltage on line 155. The low-pass filter 430 may be implemented by an inductor and a capacitor or other electrical components. A transformer and a rectifier may be optionally coupled between the switching elements 420 and the low-pass filter 430. The transformer may be used to step voltage down.

Although the power regulator unit 400 illustrated in FIG. 4 is shown to implement a switching power regulator, it should be appreciated that the present invention may be practiced with a power regulator unit implementing other types of power regulators. The controller 410, switching elements 420, and low-pass filter 430 may be implemented using any known circuitry or technique.

The controller 410 of the present invention utilizes current demand information received either directly from the processor 101 it is servicing or from a current sensor 360 (shown in FIG. 3) to respond to the power requirements of the processor 101. The controller 410 may utilize information from a look-up table or other source in order to determine how to translate the current demand information into appropriate control signals to effectuate appropriate power regulation for the processor 101.

Figure 5:
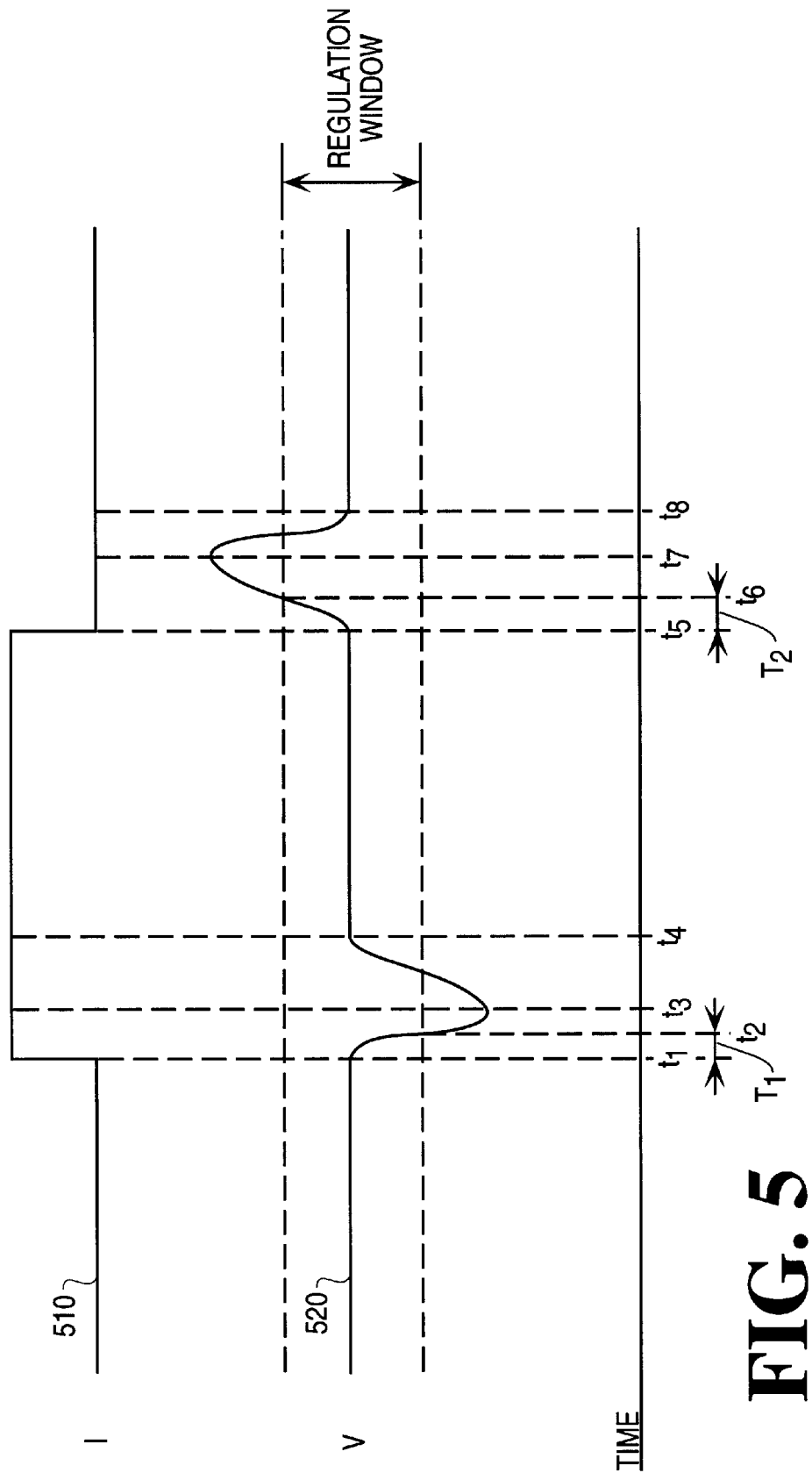
FIG. 5 is a diagram illustrating the response time of a prior art power regulator with respect to processor current demand.

Prior art power regulators responded to changes in power requirements of a processor of a computer system after a change in voltage magnitude is detected at the output terminals of its low-pass filter or remote voltage sensor. A change in voltage magnitude at the output terminals of a low-pass filter or remote voltage sensor may be detected only after a delay of a period of time. FIG. 5 is a diagram illustrating the response time of a prior art power regulator with respect to processor current demand. The current demand of a processor over time is plotted with line 510. The response time of the prior art power regulator over time is plotted with line 520. At time t1, the processor's current demand increases. The change in voltage magnitude resulting from the processor's current demand increase is not fully detected until after a delay of T1 at time t2. The power regulator is able to respond to the current demand increase at time t3. At time t4, the voltage is brought back to its original level. At time t5, the processor's current demand decreases. The change in voltage magnitude resulting from the processor's current demand decrease is not fully detected until after a delay of T2 at time t6. The power regulator is able to respond to the current demand increase at time t7. At time t8, the voltage is brought back to its original level.

In cases where a change in voltage magnitude is due to an increase in current demand, the period of time may be large enough to produce undesired delays detectable by a user of the computer system. In other cases where the change in voltage magnitude is due to a decrease in current demand, the period of time may be large enough to have excess voltage damage components in the computer system. The present invention, reduces the delays associated with responding to the current requirement of a processor by obtaining the current requirement directly from the processor or sensing the current requirement directly from the processor.

Figure 6:
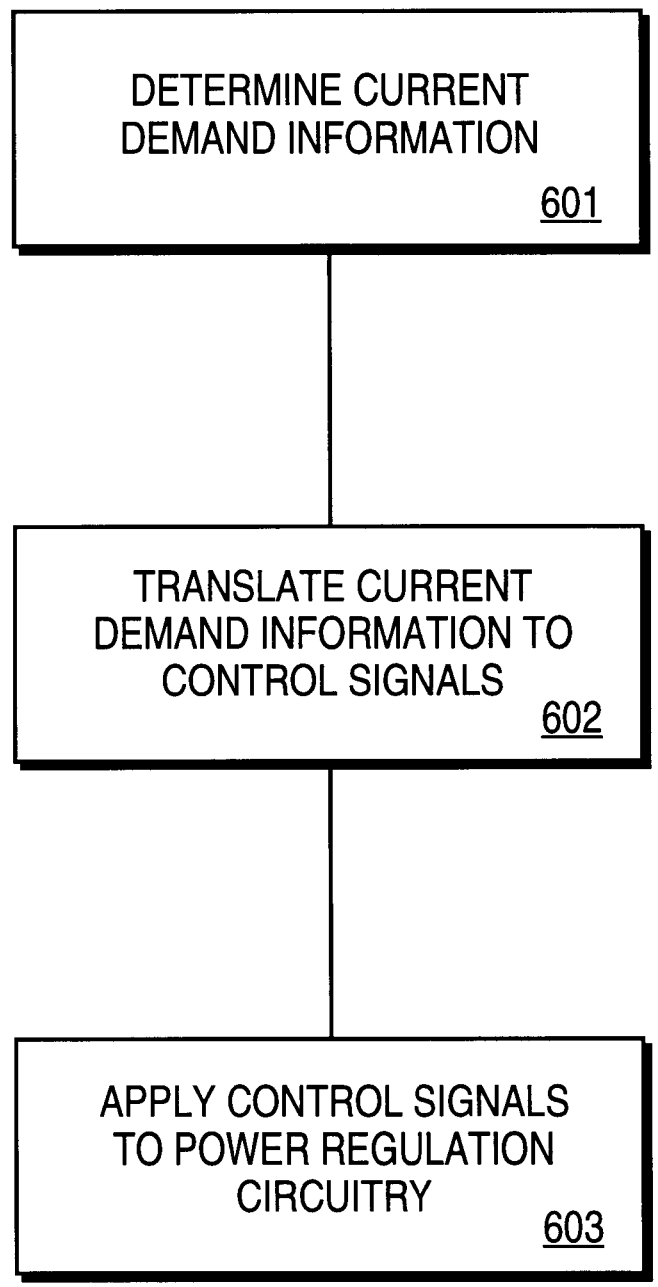
FIG. 6 is a flow chart illustrating a method for improving power regulator transient response time according to an embodiment of the present invention.

FIG. 6 is a flow chart illustrating a method for improving power regulator transient response time according to an embodiment of the present invention. At step 601, current demand of a processor is determined. According to one embodiment of the present invention, current demand of the processor is determined at a location proximate to the processor. Determining the current demand of the processor at a location proximate to the processor may be achieved by obtaining current demand information from sensing a change in magnetic field around a path of current at the location proximate to the processor. The location of the processor may be for example the Vcc pin of the processor.

According to a second embodiment of the present invention, current demand of the processor is determined from current demand information from the processor. Current demand information may be transmitted directly to a power regulator unit from the processor. The current demand information may be generated by the processor by determining an application running on the processor, determining an amount of processor cycles required for executing the application, and translating the amount of processor cycles into current demand information.

At step 602, the current demand information is translated into a control signal processable by power regulation circuitry in the power regulator unit. According to an embodiment of the present invention, translating the current demand information into a control signal that effectuates the appropriate power regulation may be achieved by referencing a look-up table.

At step 603, the control signal is applied to the power regulation circuitry.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A method for regulating power comprising:
    determining current demand of a processor at a location proximate to the processor;
    translating the current demand into a control signal via referencing a lookup table;
    applying the control signal to power regulation circuitry; and
    regulating power in response to the current demand.

2. The method of claim 1, wherein determining the current demand of the processor comprises sensing a change in magnetic field around a path of current at the location proximate to the processor.

3. The method of claim 1, wherein determining the current demand of the processor at the location proximate to the processor comprises determining the current demand at a Vcc pin of the processor.

4. A method for regulating power comprising:
    determining an application running on the processor;
    determining an amount of processor cycles required for executing the application;
    translating the amount of the processor cycles into the current demand information; and
    regulating power to a processor in response to current demand information corresponding to applications run by the processor.

5. The method of claim 4, wherein the current demand information is transmitted from the processor to the power regulator.

6. The method of claim 4, wherein regulating power in response to the current demand comprises:
    translating the current demand information into a control signal;
    applying the control signal to the power regulation circuitry.

7. The method of claim 6 wherein translating the current demand information into the control signal comprises referencing a look-up table.

8. A computer system comprising:
    a processor;
    a current sensor, situated at a location proximate to the processor, that generates current demand information of the processor, the current demand is translated into a control signal via referencing a lookup table;
    a power regulator unit, coupled to the processor and the current sensor, that regulates power to the processor in response to the control signal.

9. The computer system of claim 8, wherein the current sensor is a lossless current sensor.

10. The computer system of claim 8, wherein the location proximate to the processor is by a Vcc pin of the processor.

11. The computer system of claim 8, wherein the power regulator unit includes a controller that translates the current demand information into a control signal that is transmitted to power regulation circuitry.

12. A computer system comprising:
    a processor that generates current demand information corresponding to applications run by the processor, the current demand is translated into a control signal via referencing a lookup table;
    a power regulator unit, coupled to the processor, that regulates power to the processor in response to the control signal.

13. The computer system of claim 12, wherein the power regulator unit includes a controller that translates the current demand information into a control signal that is transmitted to power regulation circuitry.

* * * * *

UNITED STATES PATENT AND TRADEMARK OFFICE
CERTIFICATE OF CORRECTION

PATENT NO. : 6,292,902 B1
DATED : September 18, 2001
INVENTOR(S) : Drobnik

It is certified that error appears in the above-identified patent and that said Letters Patent is hereby corrected as shown below:

<u>Column 1,</u>
Line 13, delete "Modem" and insert -- Modern --.
Line 35, delete "modem" and insert -- modern --.

<u>Column 2,</u>
Line 63, delete "1,0" and insert -- I/O --.

<u>Column 3,</u>
Line 1, delete "1,0" and insert -- I/O --.

Signed and Sealed this

Twenty-first Day of May, 2002

*Attest:*

*Attesting Officer*

JAMES E. ROGAN
*Director of the United States Patent and Trademark Office*